US008719927B2

(12) United States Patent
Hassan-Le Neel et al.

(10) Patent No.: US 8,719,927 B2
(45) Date of Patent: May 6, 2014

(54) DATA FILTERING BY USING A COMMUNICATION DEVICE INCLUDING AN INTERFACE ON A DISPLAY SHOWING A DOMAIN NAME

(75) Inventors: Hidayah Hassan-Le Neel, Thomson Green (SG); Olivier Pierre Marie Le Neel, Thomson Green (SG)

(73) Assignee: Empire Technology Development LLC, Wilmington, DE (US)

( * ) Notice: Subject to any disclaimer, the term of this patent is extended or adjusted under 35 U.S.C. 154(b) by 267 days.

(21) Appl. No.: 13/054,867

(22) PCT Filed: Sep. 28, 2010

(86) PCT No.: PCT/SG2010/000367

§ 371 (c)(1),
(2), (4) Date: Mar. 30, 2011

(87) PCT Pub. No.: WO2012/044248

PCT Pub. Date: Apr. 5, 2012

(65) Prior Publication Data

US 2012/0079591 A1 Mar. 29, 2012

(51) Int. Cl.
*G06F 12/14* (2006.01)

(52) U.S. Cl.
USPC ............. 726/22; 705/405; 713/189; 713/190; 713/191; 713/192; 713/193; 717/168; 717/169; 717/170; 717/171; 717/172

(58) Field of Classification Search
USPC ..................... 726/22; 705/405; 713/189–194; 717/168–178
See application file for complete search history.

(56) References Cited

U.S. PATENT DOCUMENTS

| | | | | |
|---|---|---|---|---|
| 6,745,367 | B1 * | 6/2004 | Bates et al. | 715/205 |
| 7,558,880 | B2 * | 7/2009 | Yoshimoto | 709/245 |
| 7,752,272 | B2 * | 7/2010 | Schmidt | 709/206 |
| 7,792,994 | B1 * | 9/2010 | Hernacki | 709/245 |
| 8,073,855 | B2 * | 12/2011 | Nagoya | 707/754 |
| 8,230,061 | B2 * | 7/2012 | Hassan et al. | 709/224 |
| 8,346,746 | B2 * | 1/2013 | Lakshmanan et al. | 707/705 |
| 2002/0107925 | A1 * | 8/2002 | Goldschneider et al. | 709/206 |
| 2002/0118288 | A1 * | 8/2002 | Daigo et al. | 348/231.3 |
| 2003/0040937 | A1 * | 2/2003 | Gregersen et al. | 705/1 |

(Continued)

FOREIGN PATENT DOCUMENTS

| | | | |
|---|---|---|---|
| EP | 2081407 | A1 | 7/2009 |
| JP | 2003-174659 | | 6/2003 |

(Continued)

OTHER PUBLICATIONS

International Search Report for International Patent Application No. PCT/SG2010/000367 mailed on Nov. 15, 2010.

*Primary Examiner* — Haresh N Patel
(74) *Attorney, Agent, or Firm* — IPUSA, PLLC

(57) ABSTRACT

Technologies are generally described for data filtering for communication devices. In one example, a method of receiving data from a data source on a communication device is disclosed. The method includes determining, at the communication device, a domain name of the data source. The method also includes determining, at the communication device, one or more communication networks the communication device is connected to. The method further includes processing, at the communication device, the domain name for acceptance based on the one or more connected communication networks. The method also includes receiving the data from the data source, at the communication device, if the domain name is accepted.

31 Claims, 9 Drawing Sheets

(56) References Cited

U.S. PATENT DOCUMENTS

2003/0061508 A1 3/2003 Bhat
2003/0163567 A1* 8/2003 McMorris et al. ............ 709/225
2004/0024823 A1* 2/2004 Del Monte .................... 709/206
2004/0054733 A1* 3/2004 Weeks .......................... 709/206
2004/0158707 A1* 8/2004 Kim ............................. 713/153
2004/0199665 A1* 10/2004 Omar et al. ................... 709/238
2005/0114457 A1* 5/2005 Shih ............................. 709/206
2005/0169274 A1 8/2005 Shuster
2006/0150240 A1* 7/2006 Robinson et al. ................. 726/4
2006/0155863 A1* 7/2006 Schmidt ........................ 709/229
2006/0195912 A1 8/2006 Dew et al.
2006/0211406 A1 9/2006 Szucs et al.
2007/0005417 A1* 1/2007 Desikan et al. ................. 705/14
2007/0047701 A1* 3/2007 Morris ..................... 379/100.08
2007/0061211 A1* 3/2007 Ramer et al. .................... 705/25
2007/0111726 A1* 5/2007 Lambert et al. ............ 455/432.1
2009/0031033 A1* 1/2009 Deng et al. .................... 709/229
2009/0064301 A1* 3/2009 Sachdeva et al. ................. 726/9
2009/0144374 A1 6/2009 Laborde
2009/0149220 A1* 6/2009 Camilleri et al. ............. 455/558
2009/0279680 A1 11/2009 Chavez et al.
2010/0034088 A1* 2/2010 Sakata et al. .................. 370/235
2010/0180082 A1* 7/2010 Sebastian et al. ............. 711/126
2010/0198742 A1* 8/2010 Chang et al. .................. 705/319
2010/0251344 A1* 9/2010 Shuster ............................. 726/4
2010/0257058 A1* 10/2010 Karidi et al. ............... 705/14.55
2010/0267383 A1* 10/2010 Konstantinou et al. .... 455/435.2
2010/0291924 A1* 11/2010 Antrim et al. ................. 455/433
2010/0291943 A1* 11/2010 Mihaly et al. ................. 455/450
2011/0105026 A1* 5/2011 Hsiao et al. .................. 455/41.2
2011/0113142 A1* 5/2011 Rangegowda et al. ........ 709/227
2011/0119267 A1* 5/2011 Forman et al. ................ 707/737
2011/0151924 A1* 6/2011 Miller ........................ 455/552.1
2011/0197237 A1* 8/2011 Turner ............................ 725/78
2011/0208840 A1* 8/2011 Blackman ..................... 709/220
2011/0282954 A1* 11/2011 Flake et al. ................... 709/206
2012/0023548 A1* 1/2012 Alfano et al. ..................... 726/2
2012/0036263 A1* 2/2012 Madden et al. ............... 709/225
2012/0059820 A1* 3/2012 Lakshmanan et al. ........ 707/723
2012/0173699 A1* 7/2012 Niemela ....................... 709/224
2012/0244832 A1* 9/2012 Carlander ..................... 455/405

FOREIGN PATENT DOCUMENTS

JP 2003-299150 10/2003
JP 2007-036391 2/2007
JP 2008-250459 10/2008
JP 2010-063023 3/2010

* cited by examiner

| *Domain Name* | *Extensions* | *Data Push when Local* | *Data Push when Roaming* | *Emails when Local* | *Emails when Roaming* |
|---|---|---|---|---|---|
| SocialNetwork | .com | Accept | Refuse | Accept | Accept |
| ABCDEF | .com | Accept | Accept | Accept | Accept |
| SearchEngine | .com | Refuse | Refuse | Refuse | Refuse |
| SearchEngine | .sg | Accept | Refuse | Accept | Refuse |
| **News1**online | .co; .uk | Refuse | Refuse | Refuse | Refuse |
| **News2** online | .com | Refuse | Refuse | Refuse | Refuse |

Figure 3

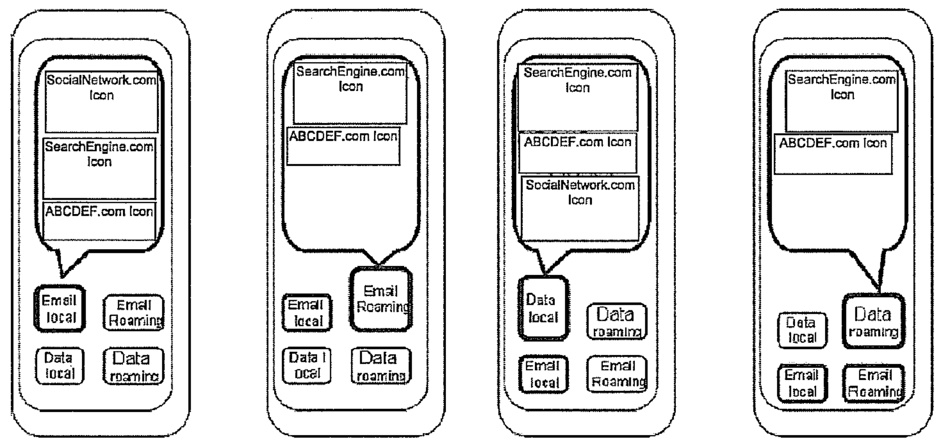

Figure 4a Figure 4b Figure 4c Figure 4d

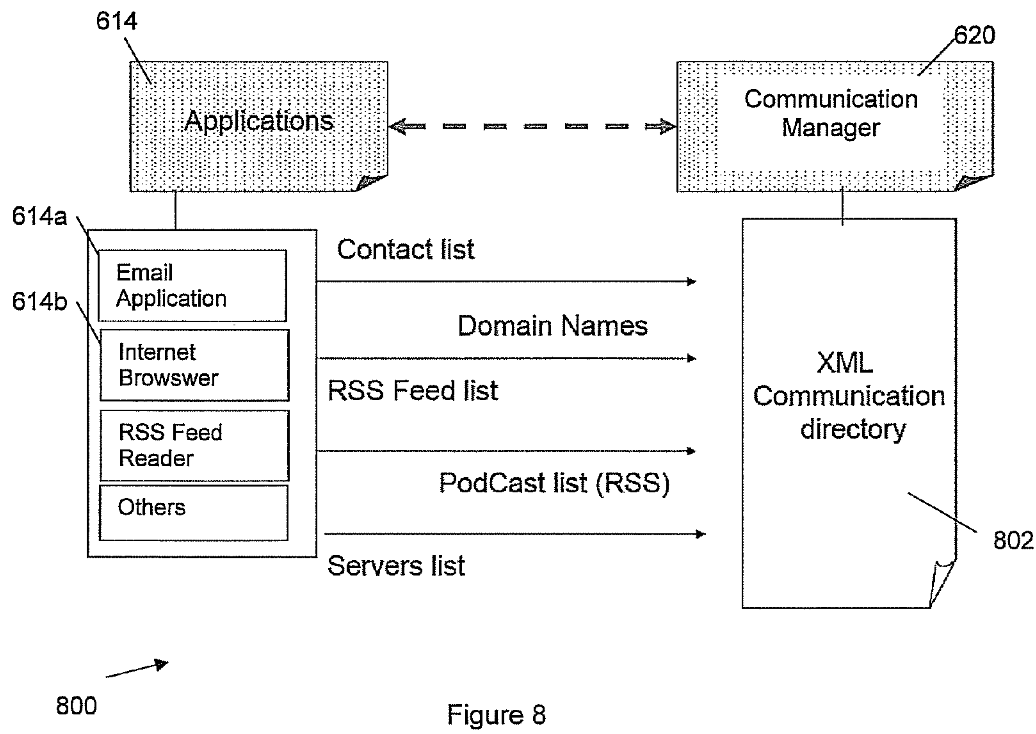

Figure 8

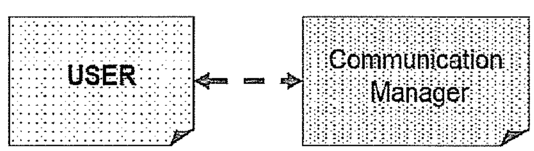

| Domain Name | Extensions | Data Push when Local | Data Push When Roaming | Emails when local | Emails when rooming | Wifi | WiGi | LAN |
|---|---|---|---|---|---|---|---|---|
| SocialNetwork | .com | Accept | Refuse | Accept | Refuse | Accept | Accept | Accept |
| ABCDEF | .com | Accept | Accept | Accept | Accept | Accept | Accept | Accept |
| SearchEngine | .com, .sg | Refuse | Refuse | Refuse | Refuse | Accept | Accept | Accept |
| News1online | .co, .uk | Refuse | Refuse | Refuse | Refuse | Accept | Accept | Accept |
| News2online | .com | Refuse | Refuse | Refuse | Refuse | Accept | Accept | Accept |
| Contact List (from eg. Email App) | | Refuse | Refuse | Refuse | Refuse | Accept | Accept | Accept |
| VOIP | .com | Refuse | Refuse | Refuse | Refuse | Accept | Accept | Accept |

Figure 9

| Application | 3G Local | 3G Roaming | Wifi | WiGi | LAN |
|---|---|---|---|---|---|
| Email | 4 | 5 | 3 | 2 | 1 |
| Internet Browser | 4 | 5 | 3 | 2 | 1 |
| RSS Reader | 3 | NO | 2 | 1 | NO |
| News1 Reader | 4 | NO | 3 | 2 | 1 |
| News2 Reader | 4 | NO | 3 | 2 | 1 |
| MMS | 4 | NO | 3 | 2 | 1 |
| VOIP | 4 | NO | 3 | 2 | 1 |

DATA FILTERING BY USING A COMMUNICATION DEVICE INCLUDING AN INTERFACE ON A DISPLAY SHOWING A DOMAIN NAME

TECHNICAL FIELD

The present disclosure relates generally to data filtering for communication devices.

BACKGROUND

Communication Devices can be connected to a variety of communication networks such as 3G GSM, LAN, Wi-Fi or WiGig networks to receive data over the Internet. The data may be in the form of, for example, media content, subscriptions to information systems or electronic mails.

It is recognised that the data received by a user may be unsolicited in the form of SPAM electronic mails, or may be pushed onto the user when the user is visiting a website. Unsolicited data can result in an increase in the volume of data received by the user which can have an impact on charges incurred by the user, particularly when the data is received via expensive communication networks. Without formal acknowledgement or acceptance from the user, the data usage by the user can result in expensive data usage charges as the user is unaware of the actual amount of data, and its associated costs, that has been received by the user.

SUMMARY

In an example embodiment, there is provided a method of receiving data from a data source on a communication device. The method includes determining, at the communication device, a domain name of the data source. The method also includes determining, at the communication device, one or more communication networks the communication device is connected to. The method further includes processing, at the communication device, the domain name for acceptance based on the one or more connected communication networks. The method also includes receiving the data from the data source, at the communication device, if the domain name is accepted.

In an example embodiment, there is provided a communication device for receiving data from a data source. The communication device includes a domain name determining module configured to automatically determine a domain name of the data source. The communication device also includes a connectivity determining module configured to determine one or more communication networks the communication device is connected to. The communication device further includes a domain name processing module configured to process the domain name for acceptance based on the one or more connected communication networks. The communication device also includes a data receiving module configured to receive the data from the data source if the domain name is accepted.

In an example embodiment, there is provided a data storage medium. The data storage medium having stored thereon having instructions that, if executed, result in determining, at a communication device, a domain name of a data source. The instructions, if executed, also result in determining, at the communication device, one or more communication networks the communication device is connected to. The instructions, if executed, further result in processing, at the communication device, the domain name for acceptance based on the one or more connected communication networks. The instructions, if executed also result in receiving the data from the data source, at the communication device, if the domain name is accepted.

BRIEF DESCRIPTION OF THE FIGURES

FIG. 3 shows an example domain directory in an example embodiment.

FIG. 4*a* shows an example embodiment of the GUI showing domains from which emails are to be accepted while connected to a local 3G cellular network.

FIG. 4*b* shows an example embodiment of the GUI showing domains from which emails are to be accepted while roaming.

FIG. 4*c* shows an example embodiment of the GUI showing domains from which data are to be accepted while locally connected.

FIG. 4*d* shows an example embodiment of the GUI showing domains from which data are to be accepted while roaming.

FIG. 8 shows a schematic diagram illustrating the creation of a communication directory, in an example embodiment.

FIG. 9 shows an example domain directory in an example embodiment.

DETAILED DESCRIPTION

Figure 1:
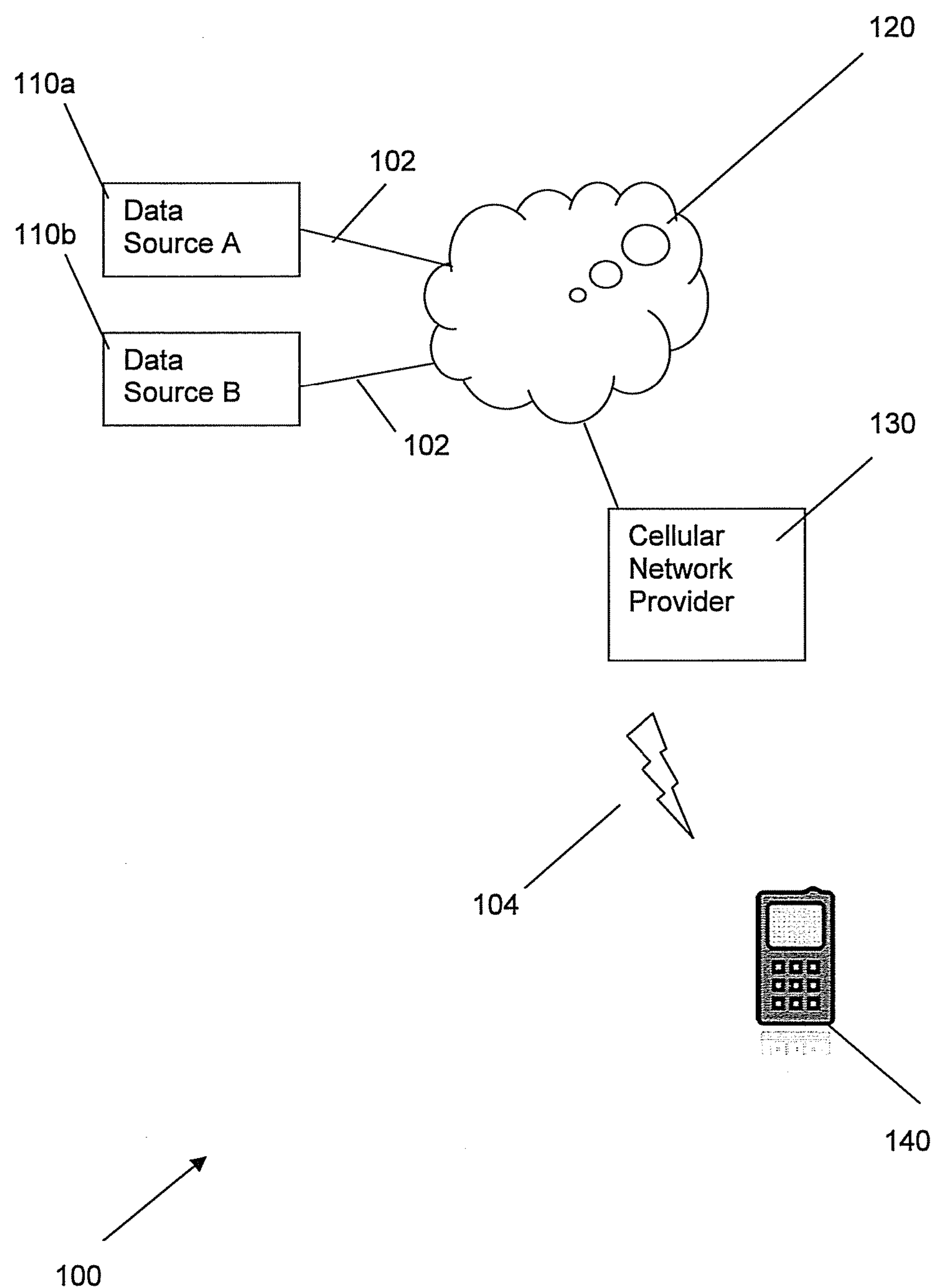
FIG. 1 is a schematic diagram illustrating an example embodiment of a data transmission system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

In example embodiments, a data filtering system and method are provided which can allow a cellular or mobile device user to selectively filter data based on the domain of the data source, using the mobile device. This can allow a user to restrict the cost of data download charges incurred over the cellular or mobile network.

In one example embodiment, the data filter may be implemented in the form of an application running on a mobile device such as a smart phone. The application can provide a menu with a directory of domain names and an associated category of the content to be accepted. In this regard, the application can provide the user with a means to control the source(s) of data transmission from which data is allowed to be received.

FIG. 1 is a schematic diagram illustrating an example embodiment of a data transmission system 100. In the example embodiment, data providers 110*a* and 110*b* host and send information via the Internet 120. The data providers 110*a*, 110*b* may be, but are not limited to, an email server or a data server. A mobile device such as, but not limited to, a cellular phone 140 accesses the Internet 120 via the wireless telephony e.g. 3G GSM connection 104 provided by the cellular network provider 130. For example, suppose the user is subscribed to a push data service e.g. where email is pushed onto the cellular phone 140 periodically, the data is transmitted from the data source e.g. 110*a* to the cellular phone 140 via the Internet 120 and cellular network 104. Alternatively, the user may be accessing a first website which may automatically cause the loading of an e.g. video clip from a second website, embedded in the code of the first website. In this regard, the data of the video clip is obtained from the second website onto the user's cellular phone 140. In the cellular phone 140, the user is prompted to accept or reject the "pushed" data such that any unsolicited data can advantageously be rejected.

Figure 2:
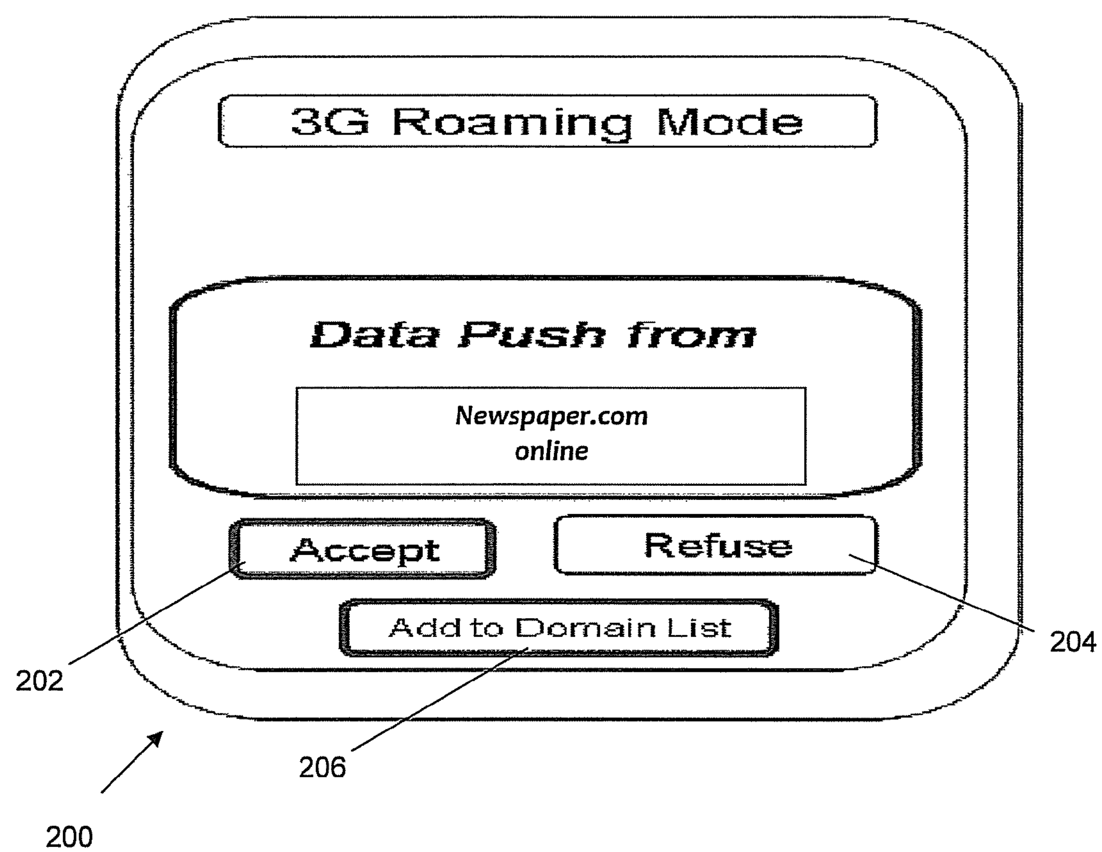
FIG. 2 shows an example display of a cellular phone.

FIG. 2 shows an example display 200 of a cellular phone 140 (FIG. 1). Each data file or stream from a source on the Internet is associated with a domain name under the DNS (Domain Name System). The display 200 shows an example interface to be displayed when data is determined to be "pushed" from a particular source with an associated domain name, e.g. newspaper.com. In the interface, the user is provided with the "accept" and "reject" buttons 202, 204 which respectively allow the user to accept or reject the "pushed" data from the domain of "newspaper.com". Should the user decide to accept the data and select the accept button 202, the associated data would be retrieved and loaded onto the cellular phone 140 (FIG. 1). Alternatively, should the user decide to reject the data and select the reject button 204, the associated data would not be retrieved.

In the example embodiment illustrated in FIG. 2, an "add" button 206 can allow the domain to be stored in a domain directory stored on the cellular phone 140 (FIG. 1). An example embodiment of a domain directory 300 is illustrated in FIG. 3. The domain directory can allow the user to customize filtering of incoming data transmission, based on different network and usage scenarios. For example, as illustrated in FIG. 3, the domain directory presently contains five domain names, e.g. socialnetwork, ABCDEF, SearchEngine, news1online and news2online. As illustrated in FIG. 3, the cellular phone 140 (FIG. 1) is configured to automatically accept data and emails from Socialnetwork.com when it is determined that the cellular phone 140 is connected to the local cellular network. If it is determined that the cellular phone 140 is connected to a foreign cellular network instead, i.e. the cellular phone 140 is roaming, all data and emails from Socialnetwork.com are automatically refused. FIG. 3 also shows the cellular phone 140 (FIG. 1) configured to automatically accept all data and emails from ABCDEF.com, regardless of whether the cellular phone 140 is roaming or connected to a local cellular network.

For each domain name, extensions can also be defined by the user, such that each domain can be further differentiated and configured accordingly. For example, as illustrated in FIG. 3, the cellular phone 140 (FIG. 1) may be configured to automatically reject all data and emails from SearchEngine.com, but automatically accept data and emails from SearchEngine.sg when connected to a local cellular network. It will be appreciated that the example embodiment may be applicable for any kind of application that provide for the exchange of data over the internet, e.g. in the form of a feed or other forms of data such as xml, html etc.

It is understood that while the above example embodiment describes automatically accepting or rejecting data or email transmissions to the cellular phone, the user may still be prompted with the interface illustrated in FIG. 2 to accept or reject the data or email transmission accordingly. For example, assuming the cellular phone 140 (FIG. 1) is configured to accept data and emails from SearchEngine.sg only when locally connected. When roaming, data and emails from SearchEngine.sg are automatically rejected. However, data or emails are not automatically downloaded from SearchEngine.sg when locally connected; rather, the user is prompted with e.g. the display screen illustrated in FIG. 2 for further confirmation, before the data or email is accepted from SearchEngine.sg. Alternatively, the data or emails may be automatically accepted when locally connected, i.e. without further user confirmation, and the user is prompted for further rejection confirmation when roaming.

The domain directory may also be displayed with a GUI (Graphical User Interface), which can allow a user to more conveniently configure the various domains. An example embodiment of the GUI showing domains from which emails are to be accepted while connected to an e.g. local 3G cellular network is shown in FIG. 4*a*. FIG. 4*b* shows an example embodiment of the GUI showing domains from which emails are to be accepted while roaming. FIG. 4*c* shows an example embodiment of the GUI showing domains from which data are to be accepted while locally connected. FIG. 4*d* shows an example embodiment of the GUI showing domains from which data are to be accepted while roaming.

It will be understood that the domain directory may be stored in a form of a database, utilizing database storage and retrieval techniques understood in the art, which are not described in detail here.

The example embodiments described above provide accept/reject rules based on the use status of the mobile device. For example, the data/email may be accepted or rejected based on the cellular telecommunication network that the mobile device is connected to, i.e. either locally or roaming in a foreign network. Other use status include the type of data that is being received. For example, as described in the example embodiments, the mobile device may be configured to automatically accept email data but reject other data types. Other data types may also include html, or media type data. It will also be understood that the database can be extended with accept/rejection rules based on a data volume/cost criteria. For example, data or email from some or all domains may automatically be rejected should they have exceeded a particular e.g. monthly volume/cost threshold.

Figure 5:
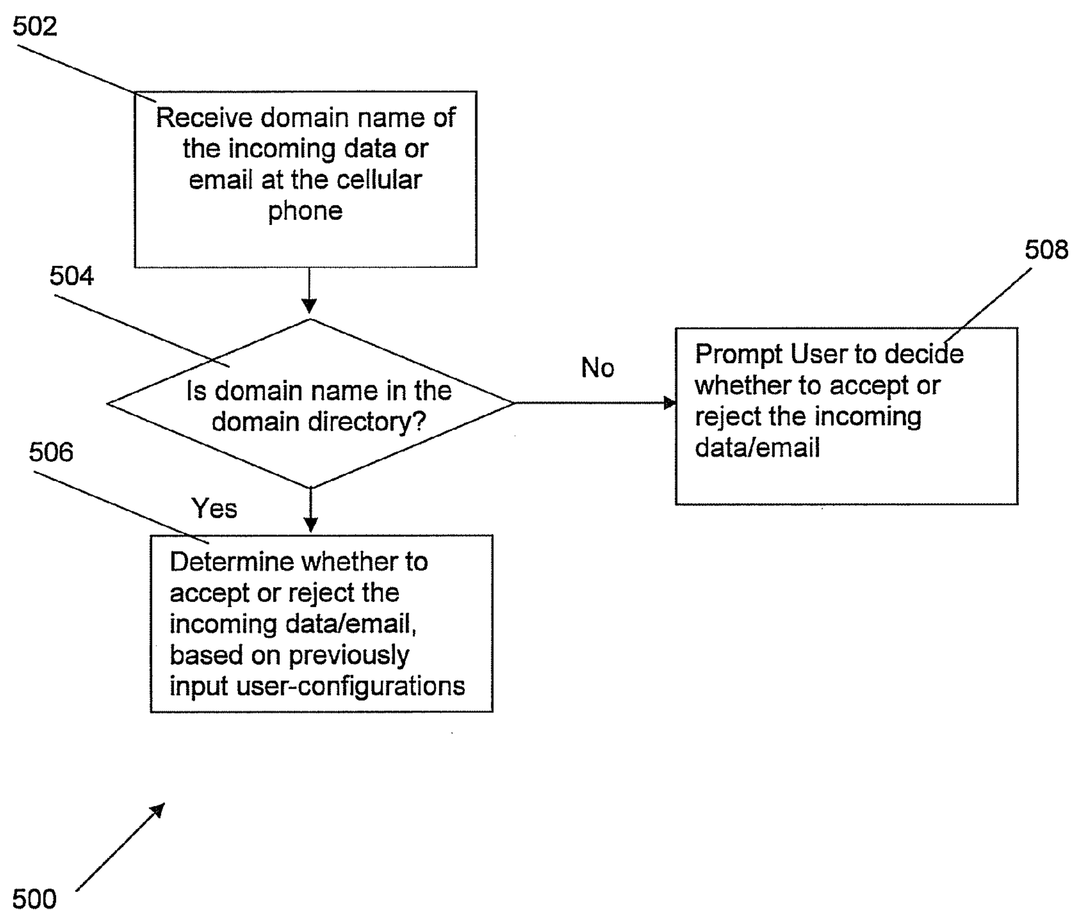
FIG. 5 is a schematic flow chart showing the steps of a data filtering method implemented in an example embodiment.

FIG. 5 is an example flow chart 500 showing the steps of a data filtering method implemented in an example embodiment. At step 502, domain name of the incoming data or email is received by the cellular phone. At step 504, the received domain name is looked up in the domain directory/repertoire. If it is determined that the domain name can be found in the domain directory, the method moves on to step 506, where the cellular phone determines whether to accept or reject the incoming data/email, based on the previously input user-configurations. For example, the cellular phone may have previously configured the cellular phone to automatically accept all data and emails from e.g. facebook.com when it is locally connected. As such, the cellular phone will first determine if the cellular phone meets the pre-determined criteria, before deciding to automatically accept or reject the data/email transmission. If the domain name cannot be found in the domain directory/repertoire, the user is prompted to make a decision to accept or refuse the data/email transmission at step 508.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 6:
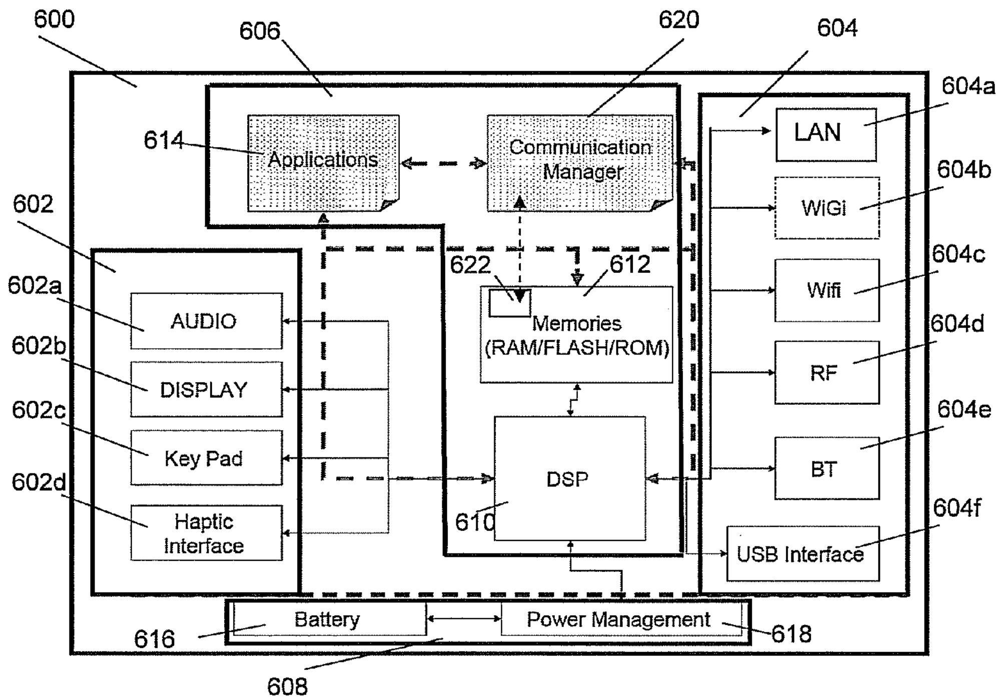
FIG. 6 shows a schematic diagram of a mobile device.

FIG. 6 shows a schematic diagram of a mobile device, such as a smart phone 600. The smart phone 600 may include four main components, namely, the human interface component 602, the communication component 604, the controller 606 and the power component 608. The human interface component 602 may further include devices 602*a*-602*d* to allow a user to interact with the smart phone 600. For example, the human interface component may allow audio and visual information to be output to the user via speakers and displays, while input from the user may be obtained via the keypad and haptic interfaces.

In the example embodiment, the communication component 604 may include devices/modules 604*a*-604*f* which are capable of allowing communication between the smart phone 600 and various types of communication networks, such as LAN, WiGig, Wi-Fi, Radio Frequency (RF), Bluetooth (BT) or a USB interface. The power component 608 may include a battery 616 for providing power to the smart phone 600 via the power management module 618.

In the example embodiment, the controller 606 may include of a processor, such as but not limited to a digital signal processor 610 and memory 612. Applications 614 which are running on the smart phone utilise the processor 610 to execute the relevant commands, while residing in the smart phone memory 612. An additional application, i.e. a communication manager application 620 can communicate with the other applications 614, and can control the processor 610 to allow or disallow data from being downloaded via specific communication devices of the communication component 604, based on the pre-determined domain directory/repertoire described in the earlier embodiments.

For example, suppose an email application wishes to download an email from "xyz@xyzmail.com". The communication manager 620 would be made aware of the intention to download the email from the "xyzmail.com" domain. This may be by way of the application 614 communicating the intention directly to the communication manager 620, or by way of the communication manager 620 monitoring the data requests from the email application 614. In some embodiments, the domain directory/repertoire 622 may be directly accessible by the application 614, such that the application 614 can determine if it should proceed to download the information from the particular domain with the presently available communication network. The communication manager 620 is also continuously updated with the present status of the various communication devices/modules 604*a-f*. With the domain of the data source (e.g. xyzmail.com) and the present status of the communication module 604, the communication manager 620 looks up the domain directory/repertoire 622 and determines if the download should be allowed or rejected. An example of the domain directory/repertoire has been previously described and illustrated in FIG. 3. A further example domain directory/repertoire is also illustrated in FIG. 9.

Figure 7:
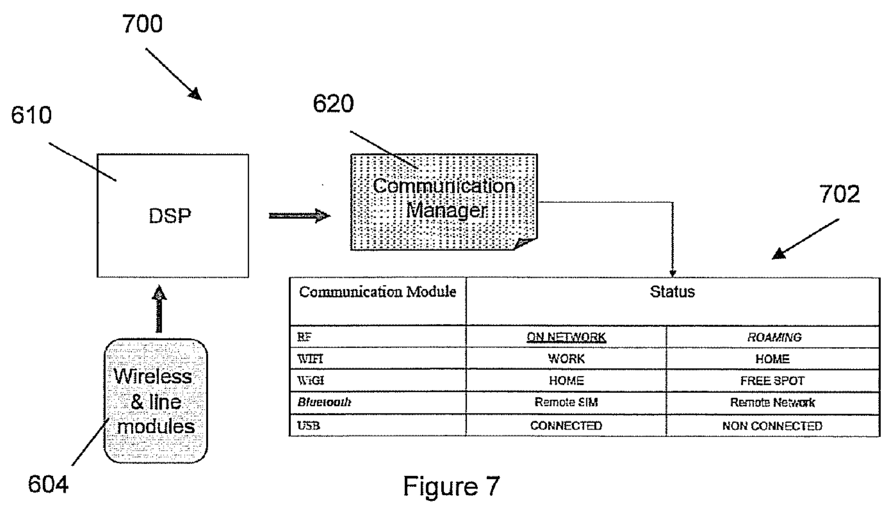
FIG. 7 shows a schematic diagram illustrating the creation and maintenance of an example status table in an example embodiment.

FIG. 7 shows a schematic diagram 700 illustrating the creation and maintenance of an example status table 702 in an example embodiment. The respective modules/devices of the communication module 604 run on the processor/DSP 610. The communication manager 620 then extracts the status of each communication module/device from the processor 610 to create/maintain a status table 702, an example of which is illustrated in FIG. 7. As shown in FIG. 7, the status of the RF communication module may be either locally connected to a "home" local 3G GSM network, or roaming on an overseas/other network. The Wi-Fi network may be the Wi-Fi network provided at the user's workplace or provided at the user's home. The WiGig network may be provided at the user's home network, or at a location where WiGig services are provided for free. The Bluetooth (BT) network may be a remote SIM network or a remote network. The USB status may be either connected or not connected. The USB or BT "network" relate to an intermediate device which allow the communication device to be connected to a network (e.g. 3G, etc.). For example, a laptop may be connected to the Internet via a 3G network. A cell phone may then be connected to the laptop via BT or USB such that the cell phone is connected to the Internet via the laptop, using the BT or USB "network". Similarly, the cell phone may be directly connected to the 3G network, with the laptop tethering the cell phone for internet access.

FIG. 8 shows a schematic diagram 800 illustrating the creation of a communication directory 802, in an example embodiment. The communication manager 620 receives contact/domain/server addresses of data sources, from the applications 614. For example, an email application 614*a* provides a contact list, from which emails are typically received from, to the communication manager 620. A browser 614*b* may provide a list of bookmarks of preferred websites often visited by the user. The browser 614*b* may also provide a list of RSS feeds to which the user is subscribed to. The user may also use FTP clients to download information directly from file servers and the FTP application may therefore provide a list of servers from which data is often obtained from. The list of contacts/domains/servers etc., may then be collated into a communication directory in the XML format.

It will be appreciated that example embodiments may be applicable to a wide variety of applications, in addition to the email and browser applications described above, The embodiments may be applicable to other applications where internet connectivity for data download is required, in e.g. dedicated newsfeed reader applications, or banking related applications where a bank may send a data feed of electronic statements or share transactions in a feed or other formats.

With the status table 702 (FIG. 7) and the list of contacts/domains/servers, the user can, Na the communication manager, input automatic acceptance/rejection of each domain, based on the communication type. For example, as illustrated in FIG. 9, the user can define automatic acceptance of data and/or emails from the domain "SocialNetwork.com", when connected to a local RF network such as 3G GSM. When connected to Wi-Fi/WiGig/LAN networks, data is also automatically accepted. In contrast, when the user is roaming in a foreign RF network, data and/or emails from the "SocialNetwork.com" domain are automatically rejected.

Figure 10:
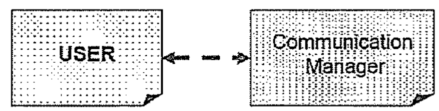
FIG. 10 shows an example priority order of communication networks for each application.

In example embodiments, the user may also define, using the communication manager, the communication mode priority for each application. This can allow the mobile device to download data via cheaper or more efficient communication modules/devices, whenever they are available. For example, as illustrated in FIG. 10, the email application, e.g. outlook, obtains data from the different communication networks in the order of LAN, WiGig, Wi-Fi, 3G local and 3G Roaming, subject to the network's availability on the communication device.

The example embodiments described above with reference to FIGS. 6 to 10 define the extraction of the data source at the application level. In these example embodiments, the applications access, either directly or via/under the control of the communication manager, the domain repertoire to determine if they are to proceed with the download of the data. This may be For example, for an email application, suppose an email is to be retrieved from "xyz@xyzmail.com". The domain of "xyzmail.com" can be directly extracted by the email application. The extracted domain is looked up in the domain repertoire/directory to determine if the download is to proceed. For data in the form of e.g. RSS feeds, the RSS reader/browser can extract the domain from the RSS subscription source. Using the extracted domain, the domain directory is looked up to determine if the RSS reader/browser is to continue with the download.

In an alternative embodiment, the extraction of the data source may be achieved from the source. In other words, as data arrives at the mobile device, the IP address of the data source is contained in the initial packets of the transmission. In this case, the communication manager can perform a reverse look-up of the IP address to obtain the domain name of the data source, and accept/reject the data packets accordingly, based on the domain directory/repertoire. With the emergence of the new IPv6 format, it will be appreciated that such reverse look-ups may not be necessary, as each data packet would already contain the domain of the data source.

It is understood that due to replicated sites and server reallocations, a specific domain name can have duplicated IP addresses. As such, the domain name can provide a common reference which can allow a user and/or the communication network provider to manage the system.

In the example embodiments, it will also be understood that the user can, based on the number of rejected domain names, report the abuse of the network from malicious service providers e.g. websites.

For billing purposes, example embodiments can allow the service provider to provide more detailed bills to the user, where the domain/IP addresses of the data sources can be itemized in bills. This can serve to provide a reminder to the user of the data sources from which the user has received data/emails from.

Further, with the domain directory and the user prompted acceptance/rejection of data source domains, the application manager can also monitor and display the data volume downloaded and rejected by domain name in real time. This can allow the user to have detailed costs associated with the data retrieval by domain name, based on the price plan to which the user is subscribed to. The example embodiments can also allow a data download limit for each domain to be pre-set. This data download limit may be based on a data volume. For example, it may be defined, that 100 Mb of data from newspaper.com be allowed from e.g. a local telecommunication network, while 1 Mb of data from newspaper.com is allowed when the user is roaming in a foreign network. Alternatively, the data download limit may be based on the associated cost. For example, the user may define that a maximum of e.g. USD25 worth of data is to be downloaded from newspaper.com while roaming in the foreign network.

In example embodiments, the information on the cost of data downloads in various scenarios e.g. when connected to local or foreign networks, are typically provided by the service provider. This may be in the form of a table in an xml format which stores the costing information. This table can be updated either by the user, or by the service provider directly via e.g. the SIM card. For example, suppose a 3G telecommunication service provider provides a data plan "A" wherein the user is charged USD1 for each megabyte (mb) of data downloaded locally, and USD5 for each mb of data downloaded when roaming in a foreign network. Such information can be included in the SIM card by the service provider upon issuance of the SIM card to the user. This table can then be read by the communication manager to perform the computations to determine the cost of download as and when it is required. As the SIM card is typically issued by the service provider at the time the user account is activated/opened, such information can be loaded accordingly by the service provider onto the SIM card. The table may also be updated when the user moves on to a different data plan e.g. "B" with a different scale of charges. The update may be performed either locally by having the user visit the service provider or remotely via remote updates of the SIM card by the service provider It will further be appreciated that example embodiments can also allow a user to monitor the data volume downloaded from each contact in a contact list obtained from an email application. This can then be translated to an associated cost for communicating with each contact. In this regard, data download limits based on volume or cost may be defined for each contact in a similar fashion.

It will be appreciated that the example embodiments can provide the user with better control over the data usage on his cellular phone, and hence allow the user to have better control over its associated cost. In allowing the user to selectively accept or refuse downloads, the user has a clearer idea of the associated costs, and can adjust his/her usage accordingly.

Further, example embodiments can reduce the amount of data transmitted over the network. As such, more bandwidth can be made available for other users, leading to more efficient bandwidth utilization, and can hence enhance the benefit to all consumers.

The greater transparency provided by the example embodiments can also reduce potential issues with regard to user disputes with the communication network provider with regard to the data used. The investigation of such disputes can be time-consuming and can affect the goodwill between the user and the communication network provider.

Figure 11:
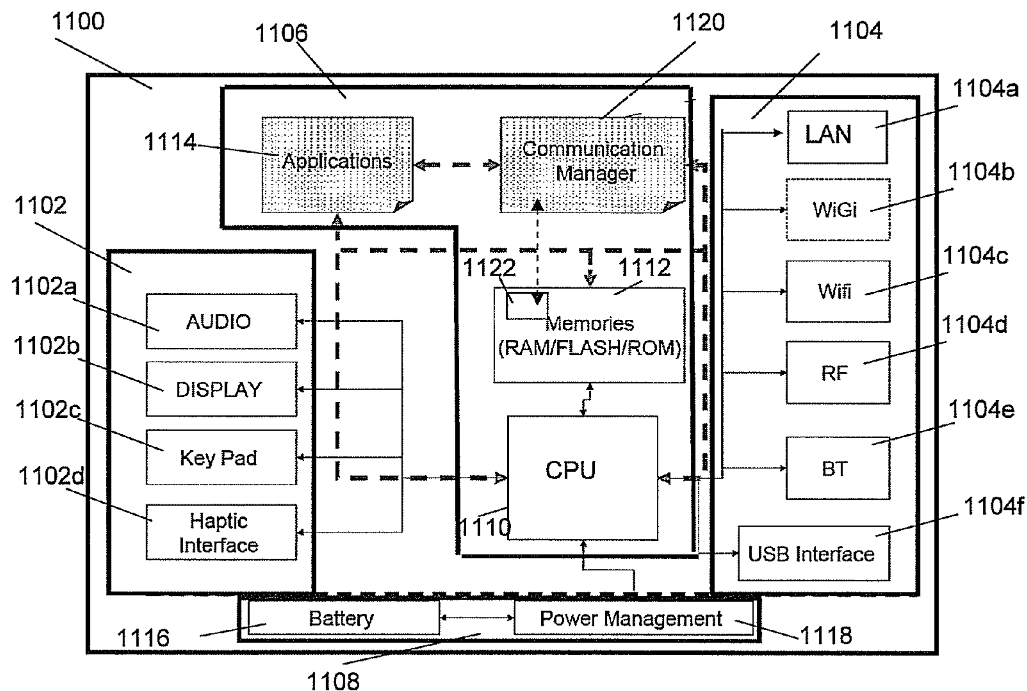
FIG. 11 shows a schematic diagram of a personal computer.

It is understood that the example embodiments described above may be extended to a personal computer, capable of being connected to a plurality of communication networks. FIG. 11 shows a schematic diagram of a personal computer, such as a laptop computer. The personal computer 1100 may include four main components, namely, the human interface component 1102, the communication component 1104, the controller 1106 and the power component 1108. The human interface component 602 may further include devices 1102*a*-1102*d* to allow a user to interact with the personal computer 1100. For example, the human interface component 1102 may allow audio and visual information to be output to the user via speakers and displays 1102*a*, 1102*b*, while input from the user may be obtained via the keypad and haptic interfaces 1102*c*, 1102*d*.

In the example embodiment, the communication component 1104 may include modules/devices 1104*a*-1104*f* which are capable of allowing communication between the personal computer 1100 and various types of communication networks, such as LAN, WiGig, Wi-Fi, Radio Frequency (RF), Bluetooth (BT) or a USB interface. The power component 1108 may include a battery or power supply 1116 for providing power to the personal computer 1100 via the power management module 1118.

In the example embodiment, the controller 1106 may include a processor 1110, memory 1112. Applications 1114 which are running on the personal computer utilise the processor 1110 to execute the relevant commands, while residing in the smart computer memory 1112. An additional application, i.e. a communication manager application 1120 can communicate with the other applications 1114, and can control the processor 1110 to allow or reject data from being downloaded via specific communication devices of the communication component 1104, based on the pre-determined domain directory/repertoire described in the earlier embodiments.

For example, suppose an email application e.g. 1114*a* wishes to download an email from "xvz@xyzmail.com". The communication manager 1120 would be made aware of the intention to download the email from the "xyzmail.com" domain. This may be by way of the application 1114 communicating the intention directly to the communication manager 1120, or by way of the communication manager 1120 monitoring the data requests from the email application 1114. In alternative embodiments, the domain directory/repertoire 1122 may be directly accessible by the application 1114, such that the application 1114 can determine if it should proceed to obtain the information from the particular domain with the presently available communication network. The communication manager 1120 is also continuously updated with the present status of the various communication devices. With the domain of the data source (e.g. xyzmail.com) and the present status of the communication module 1104, the communication manager 1120 looks up the domain directory/repertoire 1122 to determine if the download should be allowed or rejected. Examples of the domain directory/repertoire has been previously described and illustrated in FIGS. 3 and 9.

The example embodiments described above seek to filter data based on the domain of the data source and the available communication network. In example embodiments, a device, such as but not limited to a smart phone, can distinguish between being connected on to a home/local 3G GSM network and a roaming 3G GSM network, and can accordingly provide different data filtering based on the domain of the data source. This concept may be similarly extended to other connection types. For example, the device, such as a personal laptop computer, can distinguish between being connected to a LAN network provided at a workplace of the user and a LAN network provided at the home of the user. In this regard, when logged on to the workplace LAN network, the device can accordingly reject personal emails and/or RSS feeds which are not related to the user's work. Correspondingly, when the user returns home and is logged on to the home LAN network, such personal emails and/or RSS feeds would be allowed.

In the example embodiments described above, the communication device includes a communication manager for performing the configuration of the domain database. It will be understood that in alternative embodiments, the application requesting/downloading the data may internally provide the controls to allow a user to define the accept/reject allowability status of the data source domain name to be stored in the domain directory. For example, an RSS feed reader application may be subscribed to a RSS feed from the "xyznews.com" domain. The RSS feed reader application may provide controls to allow a user to define the accept/reject allowability status of the data source domain name directly within the RSS feed reader application itself, rather than via the communication manager. In such an embodiment, each application can have its own control module to individually allow the user to define the allowability status of data sources.

Figure 12:
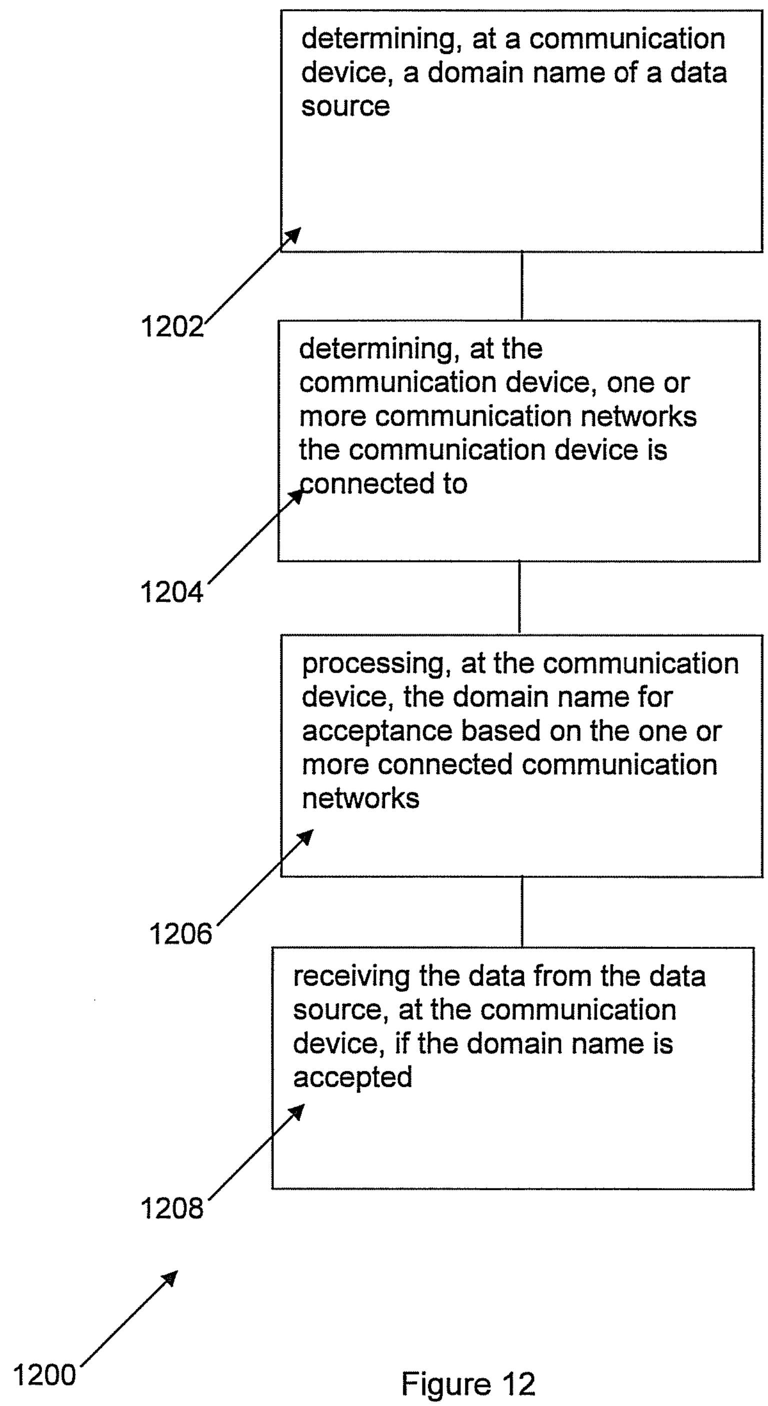
FIG. 12 is a schematic flow chart illustrating a method of data filtering in a communication device.

FIG. 12 is a schematic flow chart 1200 illustrating a method of receiving data from a data source on a communication device. At step 1202, the communication device determines domain name of the data source. At step 1204, the communication device determines one or more communication networks the communication device is connected to. At step 1206, the communication device processes the domain name for acceptance based on the one or more connected communication networks. A step 1208, the communication device receives the data from the data source if the domain name is accepted.

Figure 13:
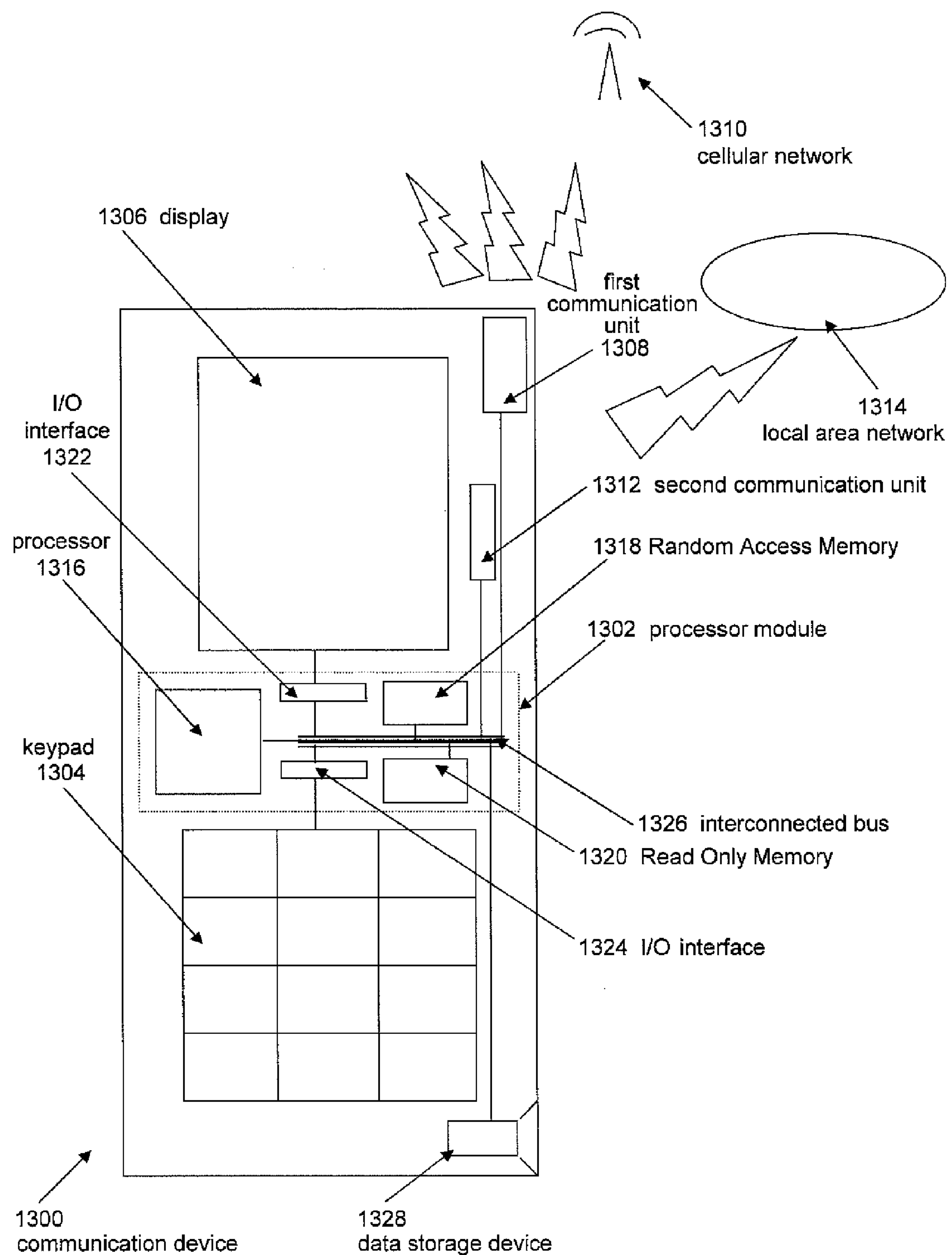
FIG. 13 is a schematic illustration of a communication device for implementing a method of the example embodiment.

The method of the example embodiment can be implemented on a communication device 1300, schematically shown in FIG. 13. It may be implemented as software, such as a computer program being executed within the communication device 1300, and instructing the communication device 1300 to conduct a method of the example embodiment.

The communication device 1300 includes a processor module 1302, an input module such as a keypad 1304 and an output module such as a display 1306.

The processor module 1302 is coupled to a first communication unit 1308 for communication with a cellular network 1310. The first communication unit 1308 can include but is not limited to a subscriber identity module (SIM) card reader interface. The cellular network 1310 can, for example, be a 3G network. The first communication unit 1308 can facilitate sending and receiving of messages from the cellular network 1310.

The processor module 1302 is further coupled to a second communication unit 1312 for connection to a local area network 1314. For example, the connection can enable wired/wireless communication and/or access to e.g. the Internet or other network systems such as Local Area Network (LAN), Wireless Personal Area Network (WPAN) or Wide Area Network (WAN). The second communication unit 1312 can include but is not limited to a wireless network card or an Ethernet network cable port. The second communication unit 1312 can facilitate sending and/or receiving data from media other than the cellular network 1310.

The processor module 1302 in the example includes a processor 1316, a Random Access Memory (RAM) 1318 and a Read Only Memory (ROM) 1320. The processor module 1302 also includes a number of Input/Output (I/O) interfaces, for example I/O interface 1322 to the display 1306, and I/O interface 1324 to the keypad 1304.

The components of the processor module 1302 typically communicate via an interconnected bus 1326 and in a manner known to the person skilled in the relevant art.

The application program is typically supplied to the user of the communication device 1300 encoded on a data storage medium such as a flash memory module or memory card/stick and read utilising a corresponding memory reader-writer of a data storage device 1328. The application program is read and controlled in its execution by the processor 1316. Intermediate storage of program data may be accomplished using RAM 1318.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components no associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an"

should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The invention claimed is:

1. A method of receiving data from a data source on a communication device having a processor to execute functions of the communication device, the method comprising:

determining, by the processor, at the communication device, a domain name of the data source;

determining, by the processor, at the communication device, one or more communication networks the communication device is connected to;

processing, by the processor, at the communication device, the domain name for acceptance based on the one or more connected communication networks; and receiving, by the processor, the data from the data source, at the communication device, when the domain name is accepted, wherein said one or more communication networks are determined based on whether the communication device is connected locally or by way of roaming, wherein processing the domain name for acceptance comprises accessing, by the processor, a domain directory, the domain directory defining an allowablity status for the domain name for one or more of the connected communication networks, and prompting, by the processor, a user to accept or reject the data based on the domain name at a time of receiving the data without changing the allowability status defined in the domain directory, when the allowability status indicates that data is allowed to be received via at least one of the connected communication networks.

2. The method as claimed in claim 1, wherein receiving the data from the data source, further comprises selecting one of the connected communication networks.

3. The method as claimed in claim 2, wherein selecting one of the connected communication networks is based on a priority table defined in the domain directory.

4. The method as claimed in claim 1, wherein the domain directory further defines a use status for the domain name.

5. The method as claimed in claim 4, wherein the use status is based on a data type of the data.

6. The method as claimed in claim 5, wherein the data type comprises any one of email data, media data, feed data, xml data, and html data.

7. The method as claimed in claim 1, wherein the domain directory further defines a download limit for the domain name.

8. The method as claimed in claim 7, wherein the download limit is based on a volume of data received from the domain for a given time period.

9. The method as claimed in claim 7, wherein the download limit is based on a cost of data charges incurred for data received from the domain for a given time period.

10. The method as claimed in claim 1, wherein processing the domain name for acceptance further comprises automatically accepting, by the processor, the domain name when the allowability status indicates that data is allowed to be received via at least one of the connected communication networks.

11. The method as claimed in claim 1, wherein prompting a user to accept or reject the data comprises providing an interface on a display of the mobile device with the domain name.

12. The method as claimed in claim 1, wherein the communication networks are selected from a group consisting of: Local Area Network, Wi-Fi network, WiGig Network, Radio Frequency cellular network, BlueTooth communication network, and USB interfaced communication network.

13. The method as claimed in claim 1, wherein determining a domain name of the data source comprises obtaining the domain name directly from a packet of the data.

14. The method as claimed in claim 1, wherein determining a domain name of the data source comprises obtaining, by the processor, an IP address from a packet of the data; and performing a reverse look up on the IP address to obtain the domain name.

15. The method as claimed in claim 1, wherein determining a domain name of the data source comprises obtaining the domain name from an application requesting the data, the application being run on the communication device.

16. A communication device for receiving data from a data source comprising:

a processor configured to execute functions of the communication device;

domain name determining module to automatically determine a domain name of the data source;

connectivity determining module to determine one or more communication networks the communication device is connected to;

domain name processing module to process the domain name for acceptance based on the one or more connected communication networks; and data receiving module to receive the data from the data source when the domain name is accepted, wherein said one or more communication networks are determined based on whether the communication device is connected locally or by way of roaming, wherein the domain name processing module accesses a domain directory, the domain directory defining an allowablity status for the domain name for one or more of the connected communication networks, and wherein the domain name processing module prompts a user to accept or reject the data based on the domain name at a time of receiving the data without changing the allowability status defined in the domain directory, when the allowability status indicates that data is allowed to be received via at least one of the connected communication networks.

17. The communication device as claimed in claim 16, wherein the data receiving module comprises network selection module configured to select one of the connected communication networks.

18. The communication device as claimed in claim 17, wherein the network selection module selects one of the connected communication networks based on a priority table defined in the domain directory.

19. The communication device as claimed in claim 16, wherein the domain directory further defines a use status of the domain name.

20. The communication device as claimed in claim 19, wherein the use status is based on a data type of the data.

21. The communication device as claimed in claim 20, wherein the data type comprises any one of email data, media data, feed data, xml data, and html data.

22. The communication device as claimed in claim 16, wherein the domain directory further defines a download limit for the domain name.

23. The communication device as claimed in claim 22, wherein the download limit is based on a volume of data received from the domain for a given time period.

24. The communication device as claimed in claim 22, wherein the download limit is based on a cost of data charges incurred for data received from the domain for a given time period.

25. The communication device as claimed in claim 16, wherein the domain name processing module automatically accepts the domain name when the allowability status indicates that data is allowed to be received via at least one of the connected communication networks.

26. The communication device as claimed in claim 16, wherein the domain name processing module provides an interface on a display of the mobile device with the domain name.

27. The communication device as claimed in claim 16, wherein the communication networks are selected from a group consisting of: Local Area Network, Wi-Fi network, WiGig Network, Radio Frequency cellular network, BlueTooth communication network, and USB interfaced communication network.

28. The communication device as claimed in claim 16, wherein the domain name determining module obtains the domain name directly from a packet of the data.

29. The communication device as claimed in claim 16, wherein the domain name determining module obtains an IP address from a packet of the data; and perform a reverse look up on the IP address to obtain the domain name.

30. The communication device as claimed in claim 16, wherein the domain name determining module obtains the domain name from an application requesting the data, the application being run on the communication device.

31. A non-transitory data storage medium having instructions to be executed by a processor to perform a method for receiving data source on a communication device, the method comprising the steps of:

determining, by the processor, at the communication device having the processor to execute functions of the communication device, a domain name of a data source;

determining, by the processor, at the communication device, one or more communication networks the communication device is connected to;

processing, by the processor, at the communication device, the domain name for acceptance based on the one or more connected communication networks; and receiving the data from the data source, by the processor, at the communication device, when the domain name is accepted, wherein said one or more communication networks are determined based on whether the communication device is connected locally or by way of roaming, wherein processing the domain name for acceptance comprises accessing, by the processor, a domain directory, the domain directory defining an allowablity status for the domain name for one or more of the connected communication networks, and prompting, by the processor, a user to accept or reject the data based on the domain name at a time of receiving the data without changing the allowability status defined in the domain directory, when the allowability status indicates that data is allowed to be received via at least one of the connected communication networks.

* * * * *

UNITED STATES PATENT AND TRADEMARK OFFICE

CERTIFICATE OF CORRECTION

PATENT NO. : 8,719,927 B2
APPLICATION NO. : 13/054867
DATED : May 6, 2014
INVENTOR(S) : Hassan-Le Neel et al.

It is certified that error appears in the above-identified patent and that said Letters Patent is hereby corrected as shown below:

In the Specification,

In Column 7, Line 10, delete “Na” and insert -- via --, therefor.

In Column 8, Line 45, delete “provider” and insert -- provider. --, therefor.

In Column 12, Line 30, delete “no” and insert -- so --, therefor.

In the Claims,

In Column 13, Line 51, in Claim 1, delete “allowablity” and insert -- allowability --, therefor.

In Column 14, Line 33, in Claim 14, delete “comprises” and insert -- comprises: --, therefor.

In Column 14, Line 62, in Claim 16, delete “allowablity” and insert -- allowability --, therefor.

In Column 16, Line 34, in Claim 31, delete “allowablity” and insert -- allowability --, therefor.

Signed and Sealed this
Seventeenth Day of March, 2015

Michelle K. Lee
*Director of the United States Patent and Trademark Office*